United States Patent [19]

Boberg et al.

[11] Patent Number: 4,826,188

[45] Date of Patent: May 2, 1989

[54] REAR WHEEL STEERING DRIVE MECHANISM

[75] Inventors: Evan S. Boberg, Royal Oak, Mich.; Larry D. Zahn, Toledo, Ohio

[73] Assignee: Chrysler Motors Corporation, Highland Park, Mich.

[21] Appl. No.: 215,122

[22] Filed: Jul. 5, 1988

[51] Int. Cl.⁴ .............................................. B62D 7/00
[52] U.S. Cl. ........................................ 280/91; 180/140
[58] Field of Search ............................. 180/140; 280/91

[56] References Cited

U.S. PATENT DOCUMENTS

| | | | |
|---|---|---|---|
| 1,951,147 | 3/1934 | Greist | 280/91 |
| 2,042,482 | 6/1936 | Ransom | 280/91 |
| 2,247,985 | 7/1941 | Borgward | 280/91 |
| 2,319,880 | 5/1943 | Pulleyblank | 280/91 |
| 2,354,830 | 8/1944 | Reid | 280/91 |
| 4,295,657 | 10/1981 | Sano et al. | 280/91 |
| 4,522,416 | 6/1985 | Sano et al. | 280/91 |
| 4,557,493 | 12/1985 | Sano et al. | 280/91 |
| 4,558,877 | 12/1985 | Furukawa et al. | 180/140 |
| 4,610,328 | 9/1986 | Kanazawa et al. | 180/140 |
| 4,647,058 | 3/1987 | Furukawa et al. | 280/91 |
| 4,648,614 | 3/1987 | Hyodo | 280/91 |
| 4,691,932 | 9/1987 | Hyodo | 280/91 |

*Primary Examiner*—Kenneth R. Rice
*Attorney, Agent, or Firm*—Edward A. Craig

[57] ABSTRACT

A rear wheel steering driving mechanism is provided for a vehicle having a front wheel steering system and a rear wheel steering system. The drive mechanism includes an input shaft adapted to be operatively connected to the front wheel steering system for rotation thereby whenever the front wheel steering system is activated and an output shaft adapted to be operably connected to the rear wheel steering system to selectively transmit front wheel steering system activity to the rear wheel system.

20 Claims, 7 Drawing Sheets

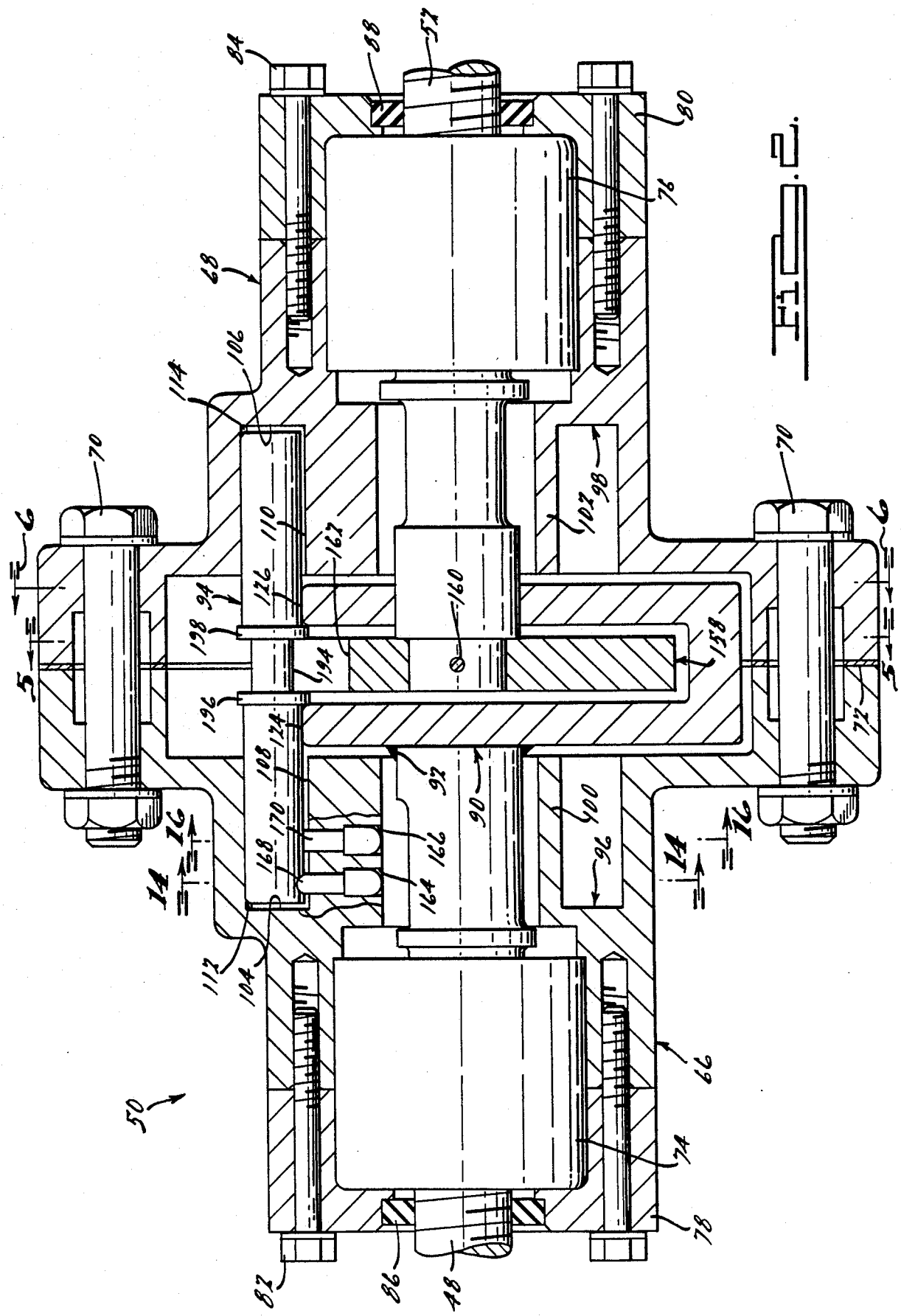

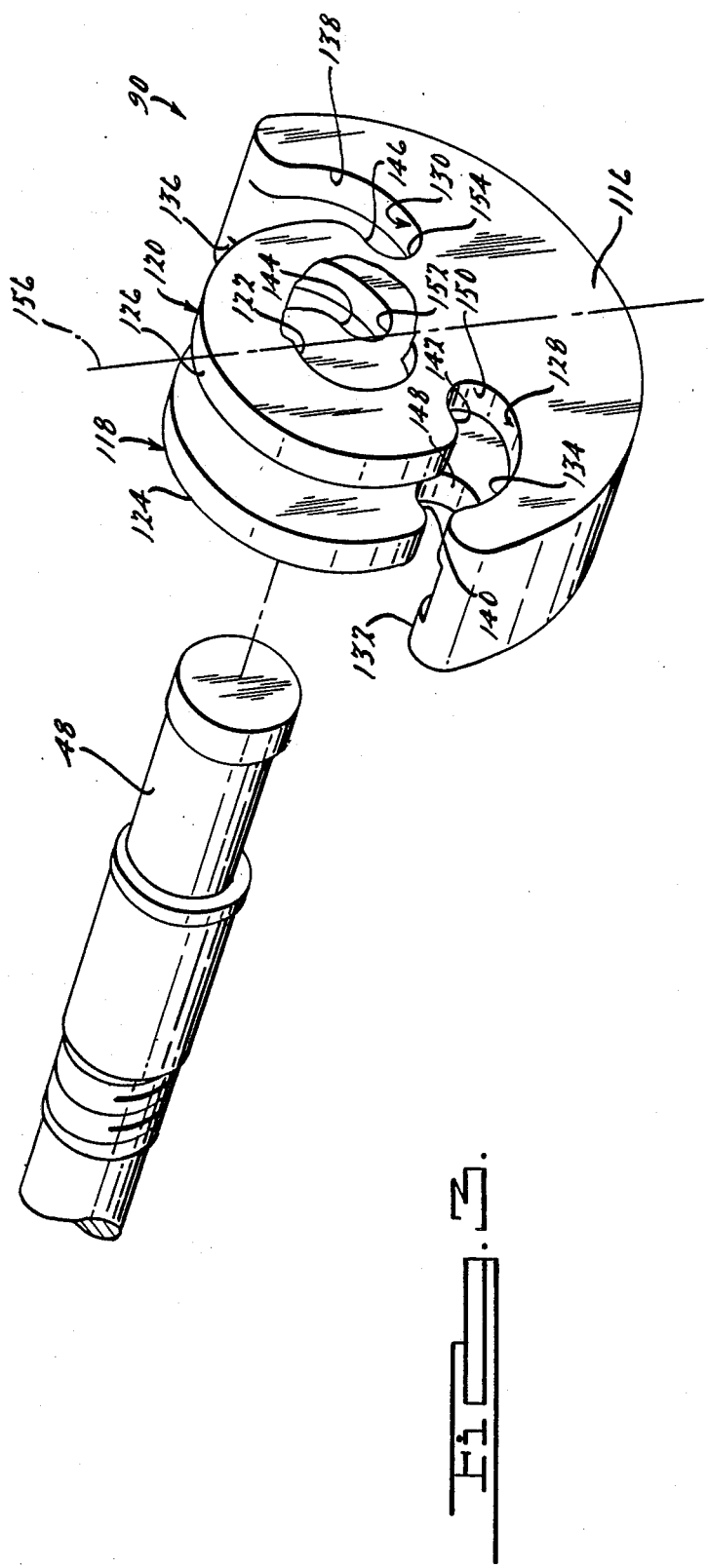

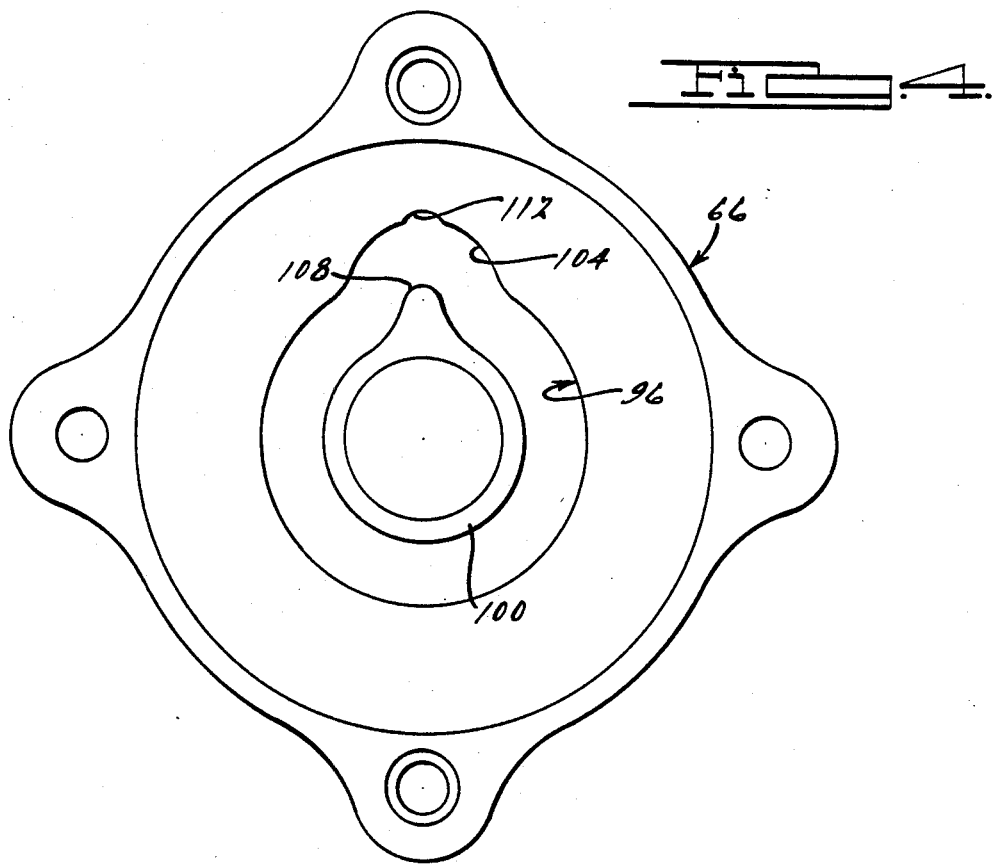
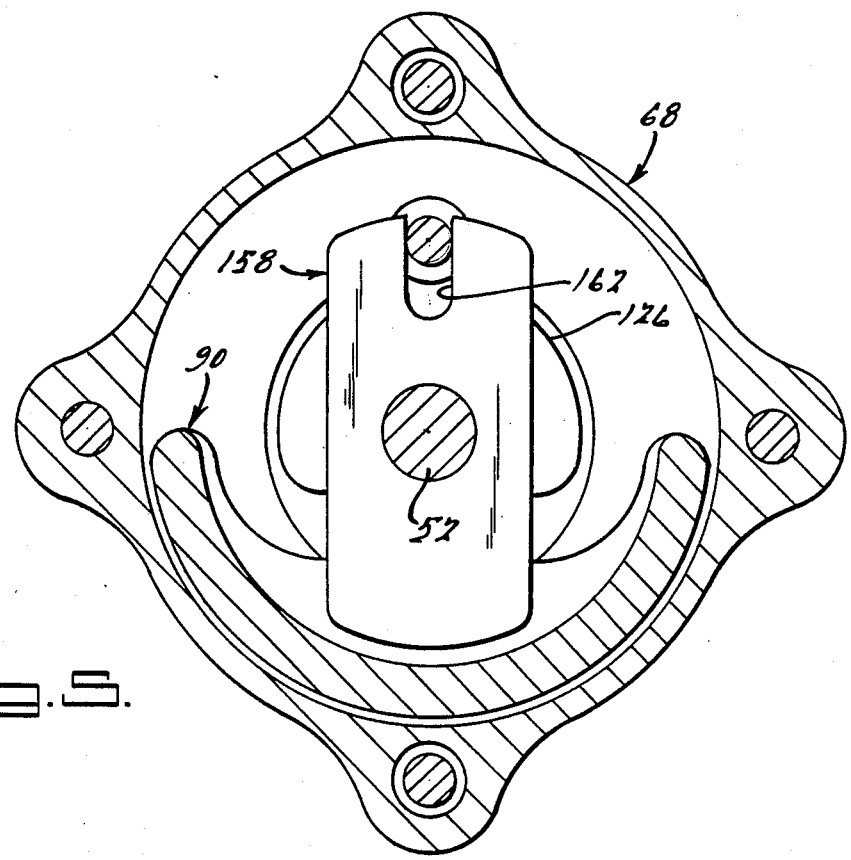

REAR WHEEL STEERING DRIVE MECHANISM

CROSS REFERENCE TO RELATED APPLICATION

This application is related to co-pending application Ser. No. 07/215,853, filed July 6, 1988.

BACKGROUND OF THE INVENTION

1. Field of the Invention:

The present invention relates to a vehicle steering device in which both the front wheels and the rear wheels are steered.

2. Description of the Prior Art:

In the past, four-wheeled vehicles, such as automobiles and trucks, have conventionally been steered by manipulation of the front wheels only. Front wheel steering has proved to be satisfactory for operation of most vehicles, particularly smaller wheelbase vehicles such as automobiles. Steering of both the front and rear wheels has not been considered particularly useful for most straight ahead driving situations.

However, it would be desirable in longer wheelbase vehicles, such as large vans, to steer the rear wheels under certain conditions. For example, if the rear wheels can be steered when turning around a corner, making a U-turn, and other similar situations, the turning radius can be desirably reduced to facilitate improved handling of such vehicles in situations where turning space in limited.

In accordance with the present invention, a rear wheel steering drive mechanism is proved wherein the steering action for the rear wheels does not come into play until after the front wheels have been turned through a preliminary angle. The rear wheels are only steered after the front wheels have been turned beyond this angle which normally represents a severe turn of the vehicle such as will occur when making a U-turn or going around a corner. In straight ahead driving, the rear wheels are not steered during small steering manipulations of the front wheels which normally occur during the course of such straight ahead driving.

SUMMARY OF THE INVENTION

A rear wheel steering drive mechanism is provided for a vehicle having a front wheel steering system and a rear wheel steering system. The rear wheel steering drive mechanism comprises a casing. An input shaft and an output shaft are journaled in the casing. The input shaft is adapted to the operatively connected to the front wheel steering system for rotation thereby whenever the front wheel steering system is activated. The output shaft is adapted to be operatively connected to the rear wheel steering system to selectively transmit front wheel steering system activity to the rear wheel steering system.

A combination cam/crank structure is positioned within the casing and is connected to the input shaft for rotation therewith. A loose crank pin is positioned within the casing in operative contact with the cam/crank structure. The casing desirably includes an interior axially extending cylindrical structure through which the input shaft and output shaft extend. The cylindrical structure defines, with the casing interior surface, an annular groove. The crank pin is received in this annular groove for movement therein. The groove has a radially outwardly extending recess. The cam/crank structure has a first cam surface portion which maintains the crank pin in a position within the radially outwardly extending recess of the groove during the initial portion of input shaft rotation thereby preventing movement of the crank pin in the remainder of the groove. The cam/crank structure has a second cam/crank surface portion which directs the crank pin out of the radially outwardly extending recess of the groove during a second portion of input shaft rotation into a position where the crank pin is moved and driven in the remainder of the groove. The cam/crank structure has a third crank surface which thereafter drives the crank pin in the remainder of the groove during a third portion of input shaft rotation.

An output crank structure is positioned within the casing and is connected to the output shaft to rotatively drive the output shaft. The crank pin is in driving contact with the output crank structure when the crank pin is driven in the remainder of the groove to thereby cause the output crank to rotate and thus cause the output shaft to rotate and transmit front wheel steering activity to the rear wheel steering system. The above-described combination is operative to return the output shaft and crank pin to their initial positions upon rotation of the input shaft in the reverse direction.

Preferably, the cam/crank structure includes duplicate first and second cam and crank surfaces positioned symmetrically about a radius of the cam/crank structure to facilitate driving the output shaft in both clockwise and counterclockwise directions.

Preferably, the first cam surface portion is substantially circular and the second cam/crank surface portion is in the form of a radially inwardly spiraling groove. The termination of this groove defines the third crank surface. It is desired that the cam/crank structure include a pair of spaced apart first, second and third surface portions for simultaneous contact with the crank pin at spaced apart locations.

The output crank structure preferably includes a slot with the crank pin being positioned in the slot at all times. The crank pin is free to move in the slot during actuation thereof by the second cam/crank surface portion during the second position of input shaft rotation. The side surfaces of the slot define crank surfaces contacted by the crank pin during the third portion of input shaft rotation. It is desired that the crank pin have a portion of reduced diameter intermediate the ends thereof which is slidably received in the slot. Adjacent portions of the crank pin are of larger diameter than the width of the slot to thereby prevent axial movement of the crank pin. The cam/crank structure includes a pair of spaced apart first, second and third surface portions for simultaneous contact with the crank pin on either side of the larger diameter portions of the pin with the output crank structure being positioned between the aforementioned pairs. A notch preferably extends radially outwardly from substantially the center of the recess in the groove. The crank pin is initially positioned in the notch by the first cam surface portions to prevent random slight movement of the crank pin in the groove prior to rotation of the input shaft.

The aforesaid cylindrical member within the casing preferably has a pair of angularly spaced apart radially outwardly directed passageways extending from the interior thereof to the groove and located so that the entrances thereto from the groove are positioned on either side of the crank pin when the crank pin is in its initial position and the entrances thereto from the casing interior are positioned in alignment with the input shaft. A stop pin is slidably received in each of the passageways. A portion of the exterior surface of the input shaft is in contact with the inner end of both stop pins. The exterior surface portion of the input shaft has a first generally circular cam surface portion operable to maintain both stop pins in a raised position wherein the outer ends thereof block the crank pin and prevent it from moving into the remainder of the groove. The input shaft has a second generally circular cam surface portion of less diameter than the diameter of the first cam surface portion which is operable to allow the stop pins to slide in the passageways to a lowered position out of blocking position with respect to the crank pin to allow movement of the crank pin into the remainder of the groove. The cam surface portions of the input shaft are of a size and are located so that they are synchronized with the cam surface portions of the cam/crank structure to co-act therewith in providing the desired rear wheel steering drive. Substantially one-half of the first and second cam surface portions of the input shaft are located on one side of a diameter of the input shaft which passes through the center of the angular space between the passageways and the remainder of the first and second cam surface portions of the input shaft lie on the other side of the side of the diameter so that initially only one of the stop pins can slide in its passageway to a lowered position with the other stop pin remaining in its raised position to thereby prevent inadvertent movement of the crank pin in the wrong direction prior to the time that it is positively engaged by the crank cam/crank structure.

BRIEF DESCRIPTION OF THE DRAWINGS

FIG. 2 is a longitudinal sectional view of the rear wheel steering drive mechanism forming one embodiment of the present invention;

FIG. 3 is an exploded view in perspective of the input shaft and cam/crank structure incorporated into the rear wheel steering drive mechanism of the present invention;

FIG. 4 is a view in elevation of the interior of the input half of the casing forming part of the rear wheel steering drive mechanism of the present invention;

FIG. 5 is a sectional view taken substantially along the line 5—5 of FIG. 2 looking in the direction of the arrows;

DETAILED DESCRIPTION OF A PREFERRED EMBODIMENT

Figure 1:
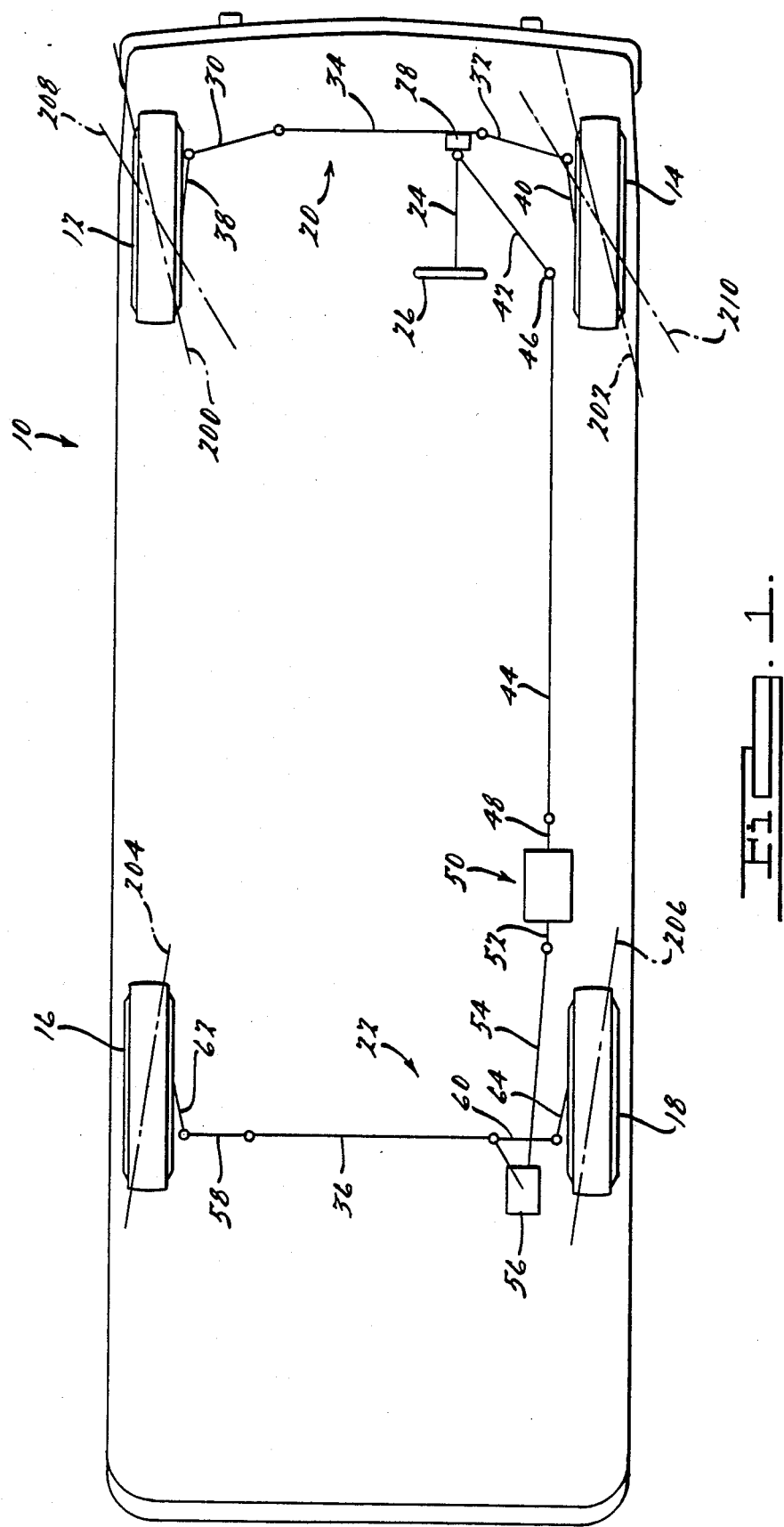
FIG. 1 is a diagrammatic plan view of a vehicle having a front wheel steering system and a rear wheel steering system with the rear wheel steering drive mechanism of the present invention interposed therebetween.

Referring first to FIG. 1, a vehicle 10 is diagrammatically illustrated. The vehicle 10 includes a pair of front wheels 12, 14 and a pair of rear wheels 16, 18. A conventional front wheel steering system 20 is provided for the front wheels and a conventional rear wheel steering system 22 is provided for the rear wheels. A steering shaft 24, having a steering wheel 26, is provided for manual steering by the driver of the vehicle. The steering shaft 24 is connected to a direction changing means installed in a gearbox 28. Rotation of the steering shaft 24 is transformed to right or left turning of the front wheels 12, 14 by means of tie rods 30, 32 which are connected to connecting rod 34 under, for example, a rack-and-pinion type of direction changing means. The tie rods are connected to the arms of steering knuckles 38, 40 which support the front wheels 12, 14. The steering action may be assisted as is usual by power steering structure provided in the gearbox 28.

A connecting shaft 42 is connected internally to a mechanism in the gearbox 28 through an operating force transmitting means such as a rack-and-pinion, bevel gear, worm gear or the like. An operating shaft 44 is connected to the connecting shaft 42 by means of a universal joint 46. The operating shaft 44 extends rearwardly of the vehicle 10 and is connected to the input shaft 48 of the rear wheel steering drive mechanism 50 of the present invention.

The mechanism 50 has an output shaft 52 which is connected to a second operating shaft 54. The operating shaft 54 is operatively connected to a second gearbox 56. The gearbox may, again, drive a steering mechanism 36 of the rack-and-pinion type. Tie rods 58, 60 are connected to the mechanism 36 for actuation thereby. The tie rods 58, 60 are connected to the arms of steering knuckles 62, 64 which support the rear wheels 16, 18 and which may be steered in the right or left direction as described in connection with the front wheel steering system. The front and rear wheel steering systems 20, 22 of the present invention are conventional. Operative examples thereof are disclosed in U.S. Pat. Nos. 4,557,493, issued Dec. 10, 1985 and 4,691,932, issued Sept. 8, 1987.

Referring to FIG. 2, the rear wheel steering drive mechanism 50 includes a casing comprised of an input half 66 and an output half 68. These halves are connected together by means of nut and bolt structures 70 with an annular seal member 72 being provided between the casing halves to seal the interior of the casing. The input shaft 48 is suitably journaled within the casing by means of bearing structure 74. Similarly, the output shaft 52 is suitably journaled within the casing by means of bearing structure 76. End seal caps 78, 80 are secured over the outer ends of the bearing structures 74, 76 by means of bolt structures 82, 84 with the input and output shafts threadingly extending through seal members 86, 88.

As above-described, the input shaft 48 is operatively connected to the front wheel steering system 20 for rotation thereby whenever the front wheel steering system is activated. However, the output shaft, which is operatively connected to the rear wheel steering system 22, only selectively transmits front wheel system activity to the rear wheel steering system. The reason for this is that it is not desired to have the rear wheels turn during initial stages of front wheel turning such as occur in ordinary front ahead driving. It is only desired that the rear wheels turn when the front wheels are turned a significant degree. The rear wheels are designed to assist in turning around a corner or making a U-turn or like significant front wheel turning activity.

To accomplish this, a combination cam/crank structure 90 is positioned within the casing and is connected to the input shaft 48 as by welding at 92. The combination cam/crank structure 90 consequently at all times rotates with the input shaft. The input shaft, as above described, being connected to the front wheel gear box 28, will rotate whenever the front wheel steering system 20 is activated.

A loose crank pin 94 is positioned within the casing in operative contact with the cam/crank structure 90. The use of the term "loose" is intended to connote the absence of a permanent physical connection to any other part of the drive structure. The pin 94 is received within an annular groove structure provided within the casing. The groove structure comprises a pair of oppositely disposed grooves 96, 98, each of which is provided within one of the casing halves 66, 68. The pin 94 is free to move within the grooves excepting as it is constrained by other operating elements of the drive mechanism. Each of the casing halves has an interior axially extending hollow cylindrical members 100, 102 through which the input and output shafts 48, 52 extend. The cylindrical members 100, 102 define, with the casing interior surface, the grooves 96, 98. As can be best seen in FIGS. 2 and 4, both grooves 96, 98 have radially outwardly extending recesses 104, 106 in the upper portions thereof as viewed in the figures. The cylindrical members 100, 102 each have a protuberance 108, 110 configured to follow the conformation of the recesses 104, 106 to thereby form continuous grooves. Each recess 104, 106 has a notch 112, 114. The function of the notches 112, 114 is to assist in maintaining the crank pin 94 in a centered position during periods when it is not desired to steer the rear wheels of the vehicle. The crank pin 94 is captured within the recesses 104, 106 during such periods, the notches 112, 114 preventing random slight movement of the crank pin 94 in the grooves prior to rotation of the output shaft 52.

As best shown in FIG. 3, the cam/crank structure 90 is composed of a relatively solid lower circular structure 116 from which extend spaced apart lobes 118, 120. The input shaft 48 is secured to the lobe 118. The lobe 120 has an opening 122 through which the output shaft 52 rotatably extends. Each lobe 118, 120 has a first cam surface portion 124, 126. These portions are substantially circular. The function of cam surfaces portions 124, 126 is to maintain the crank pin 94 in a position within the radially outwardly extending recesses 104, 106 of the grooves during the initial portion of input shaft rotation thereby preventing movement of the crank pin 94 in the remainder of the grooves 96, 98.

Second cam/crank surface portions are defined by radially inwardly spiraling slots 128, 130. Each slot is defined by upper surface portions 132, 134, 136, 138 of the cam/crank lower structure 116 and by lower surface portions 140, 142, 144, 146 of the lobes 118, 120. As will be appreciated, the pair of slots 128, 130 is provided to facilitate both left and right turning.

As before mentioned, the slots 128, 130 comprise a second cam/crank surface portion which directs the crank pin out of the radially outwardly extending recesses 104, 106 of the grooves during a second portion of input shaft rotation into a position where the crank pin 94 can move into the remainder of the grooves while at the same time driving the crank pin 94 in a circular motion. When this occurs, the front wheels have already been turned through an angle where it is desired to begin turning the rear wheels also.

The cam/crank structure 90 has a third crank surface portion defined by the termination of the slots 128, 130 at 148, 150, 152, 154. These third crank surface portions do not cause a camming action but are pure crank drive surface to drive the crank pin 94 in the remainder of the groove during a third portion of input shaft rotation, this portion of rotation being the portion where it is desired to turn the rear wheels along with the front wheels.

As will be appreciated from the above description of the cam/crank structure 90, it includes duplicate first, second and third spaced apart surface portions for simultaneous contact with the crank pin 94. This arrangement results in even driving of the crank pin 94. The duplicate first, second and third surface portions are positioned symmetrically about a diameter 156 of the cam/crank structure 90 as will be noted in FIG. 3 to facilitate driving the output shaft 52 in both clockwise and counterclockwise directions.

An output crank structure 158 is positioned within the casing and connected to the output shaft 52 by means of a screw 160 to rotatively drive the output shaft 52. As will be noted, the output crank structure includes a slot 162. The crank pin 94 is positioned in the slot 162 at all times. The crank pin 94 is free to move in the slot during actuation thereof by the second cam/crank surface portion during the second portion of input shaft rotation. The side surfaces of the slot define crank surfaces contacted by the crank pin 94 during the second and third portions of input shaft rotation.

FIGS. 2, 5, 6 and 7 illustrate the rear wheel steering drive mechanism 50 in its centered position. In this position, the front wheels are aimed directly forwardly. As will be noted, the first cam surface portions 124, 126 maintain the crank pin 94 within the recesses 104, 106 in this position. As the front wheels are turned to either the right or left, the first cam surface portions 124, 126 continue to maintain the crank pin 94 within the recesses 104, 106 until the second cam/crank surface portions are encountered. The pin 94 cannot move out of the recesses because it is physically blocked. However, if the pin 94 were not centered within the notches 112, 114, it would be capable of limited movement within the recesses 104, 106. This would cause slight movement of the rear wheels which is undesirable. In the embodiment illustrated, this movement would amount to about 10 angular degrees (which would not, of course, result in 10 degrees of rear wheel movement but rather a reduced amount of such movement).

Centering of the crank pin 94 in the notches 112, 114 is complemented by means of a stop pin arrangement provided in the input casing side. This structure is best illustrated in FIGS. 2, 14, 15, 16 and 17. As will therein be noted, the cylindrical member 100 has a pair of angularly spaced apart, radially outwardly directed passageways 164, 166 extending from the interior thereof to the groove 96 and located so that the entrances thereto from the groove are positioned on either side of the crank pin 94 when the crank pin is in its initial, centered position. The entrances thereto from the casing interior are positioned in alignment with the input shaft 48. A stop pin 168, 170 is slidably received in each of the passageways. As will be noted, the stop pins have enlarged inner portions which are received in enlarged inner portions of the passageways 164, 166 to thereby define abutment surfaces 172, 174 which prevent the pins from escaping radially outwardly from the passageways. The inner ends of the pins are rounded to provide smooth camming action with input shaft cam surfaces 176, 178. The outer ends of the stop pins and the crank pin are rounded to provide smooth contact therebetween (and also between the crank pin and other parts which it touches).

Figure 14:
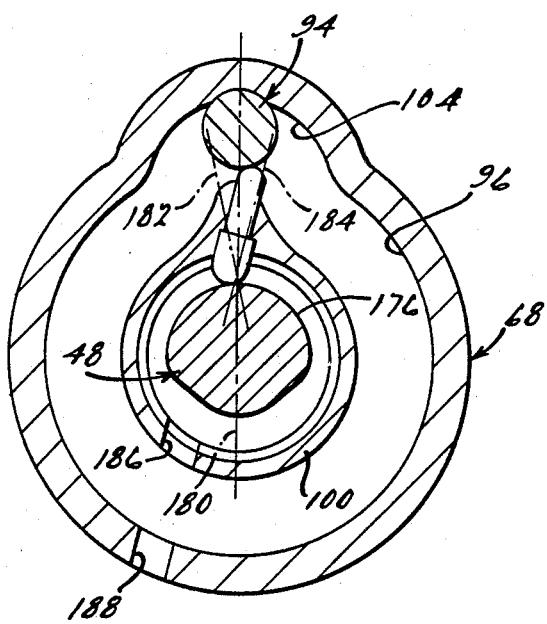
FIG. 14 is a sectional view taken substantially along the line 14—14 of FIG. 2 looking in the direction of the arrows.
Figure 16:
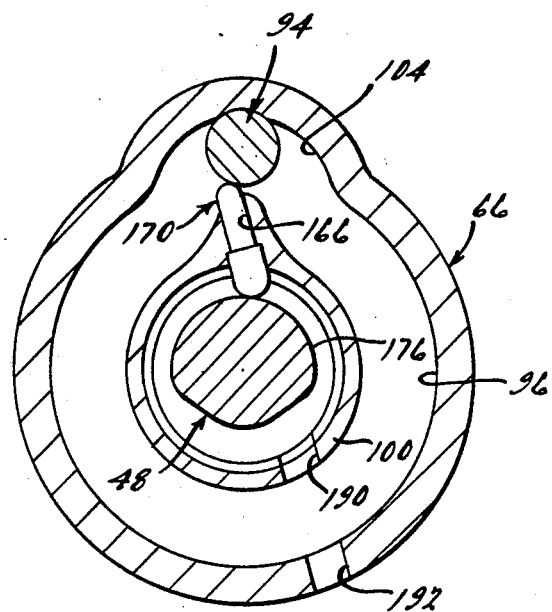
FIG. 16 is a sectional view taken substantially along the line 16—16 of FIG. 2 looking in the direction of the arrows.

These cam surface portions of the shaft are located in radial alignment with the stop pins 168, 170. A portion of the exterior surface of the input shaft 48 is always in contact with the inner ends of both stop pins 168, 170. The first cam surface portion 176 of the input shaft defines a generally circular cam surface portion operable to maintain both stop pins in a raised position as shown in FIGS. 2, 14 and 16 wherein the outer ends thereof block the crank pin 94 and prevent it from moving into the remainder of the grooves 96, 98. This arrangement results, with the notches 112, 114, in a three point contact which holds the crank pin 94 securely in the centered position.

Figure 15:
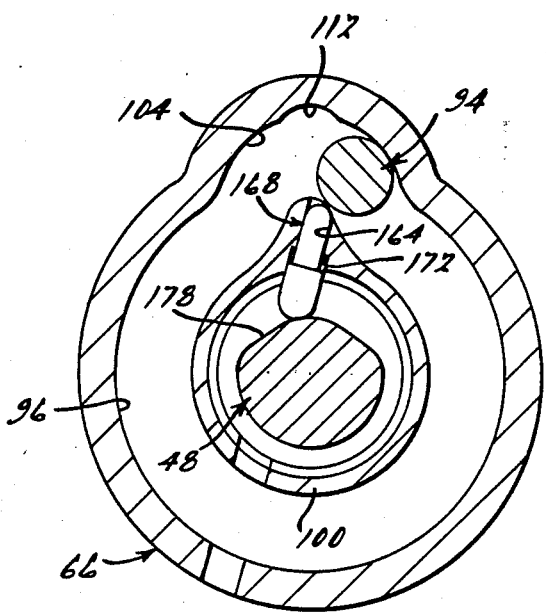
FIG. 15 is a view similar to FIG. 14 with the input shaft rotated in one direction.
Figure 17:
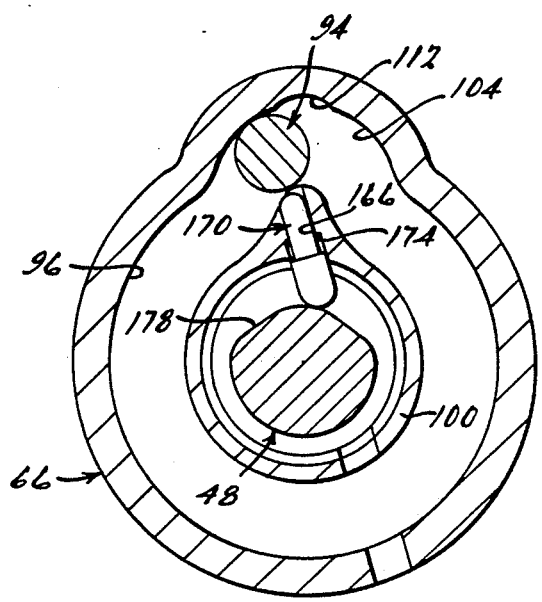
FIG. 17 is a view similar to FIG. 16 with the input shaft rotated in the opposite direction as that shown in FIG. 15.

The second cam surface portion 178 of the input shaft 48 also defines a cam surface portion of gradually less diameter than the diameter of the portion 176 and is operable to allow the stop pins 168, 170 to slide in the passageways 164, 166 to a lowered position as shown in FIGS. 15 and 17 out of blocking position with respect to the crank pin 94 to allow movement of the crank pin into the remainder of the grooves 96, 98. The cam surface portions 176, 178 are of a size and are located so that they are synchronized with the cam surface portions of the cam/crank structure 90 to coact therewith in providing the desired rear wheel steering drive. In the embodiment shown, the cam surface 176 occupies about 240 angular degrees while the cam surface 178 occupies about 120 angular degrees.

Substantially one-half of the first and second cam surface portions 176, 178 of the input shaft are located on one side of a diameter 180 of the input shaft 48, which diameter passes through the center of the angular space between the passageways, this angular space being indicated by the lines 182, 184 of FIG. 14. The remainder of the first and second cam surface portions 176, 178 of the input shaft 48 lie on the other side of the diameter 180 so that initially only one of the stop pins can slide in its passageway to a lower position with the other stop pin remaining in its raised position to thereby prevent inadvertent movement of the crank pin 94 in the wrong direction prior to the time that it is positively engaged by the cam/crank structure 90. This could possibly occur if the rear wheels hit a bump or rut in the road surface.

The openings 186, 188 and 190, 192 illustrated in FIGS. 14 and 16 do not function in the operation of this device. These openings are merely access openings which permit formation of the passageways 164, 166.

Turning again to the relationship between the crank pin 94 and output crank structure 158, it will be noted in FIG. 2 that the crank pin has a portion 194 of reduced diameter intermediate the ends thereof. The reduced diameter portion 194 is the portion which is slidably received in the output crank structure slot 162. Adjacent portions 196, 198 of the crank pin are positioned on the exterior of the output crank structure and are of larger diameter than the width of the slot 162 to thereby prevent axial movement of the crank pin 94. Thus, the crank pin 94 is fixed in the axial position illustrated in FIG. 2.

Figure 6:
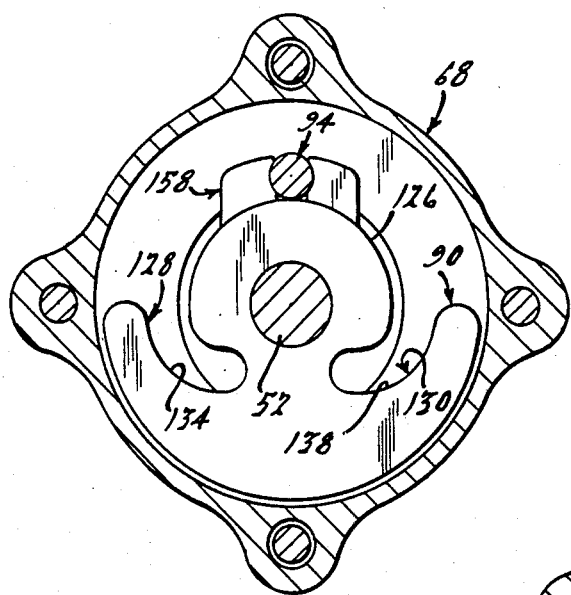
FIG. 6 is a sectional view taken substantially along the line 6—6 if FIG. 2 looking in the direction of the arrows and on a reduced scale.
Figure 7:
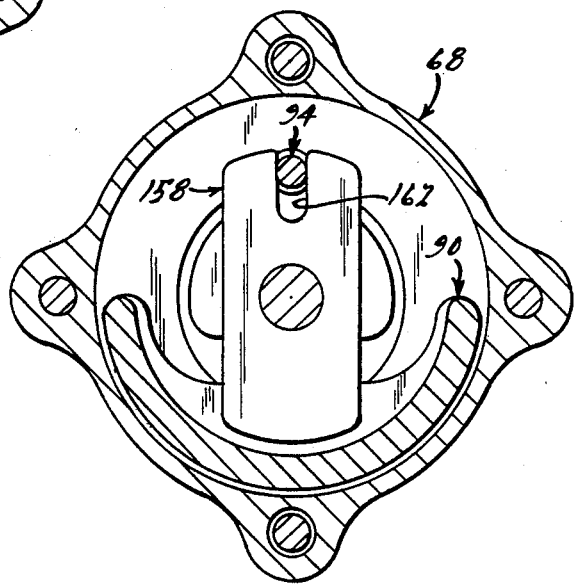
FIG. 7 is a view similar to FIG. 5 on a reduced scale.

Operation of the rear wheel steering drive mechanism 50 will now be described. The initial centered position of the mechanism is shown in FIGS. 6 and 7. The crank pin 94 and output crank structure 158 will remain in this position so long as the crank pin is in contact with the first cam surface portions 124, 126 and is not impinged upon by the second cam/crank surface portions of the slots 128, 130. Thus, left or right turning of the front wheels 12, 14 will not cause rear wheel steering during the initial portion of input shaft rotation. Rear wheel steering does not begin until the front wheels have been turned through the first portion of steering which is represented by the lines 200, 202 of FIG. 1. In one actual embodiment of the invention, this portion amounted to 14.75 angular degrees of initial front wheel steering.

Figure 8:
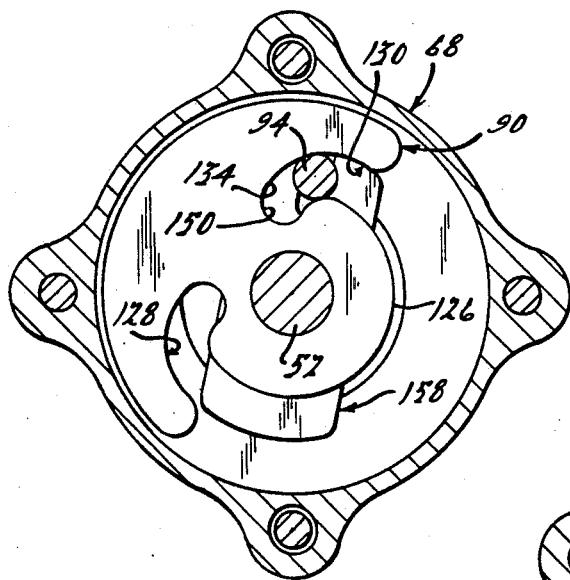
FIG. 8 is a view similar to FIG. 6 with the cam/crank mechanism moved to an intermediate position.
Figure 9:
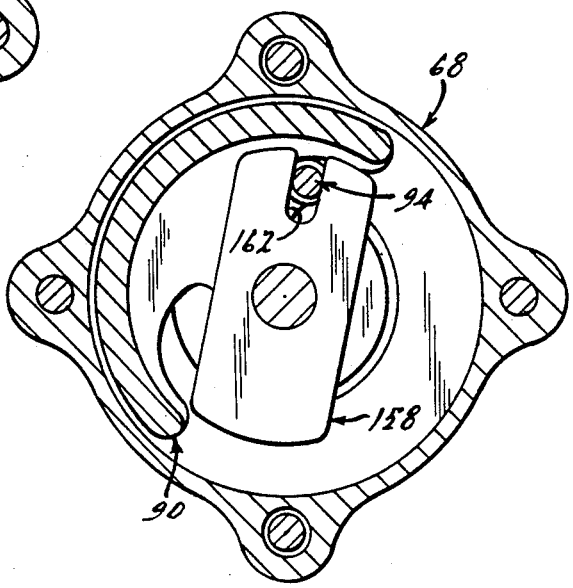
FIG. 9 is a view similar to FIG. 7 with the structure in the same position as that illustrated in FIG. 8.

During a second portion of input shaft rotation, the second cam/crank surface portion, namely the surfaces 132, 134 (or the surfaces 136, 138 if the front wheels are turned in the other direction) direct the crank pin 94 into the slot 162 of output crank structure 158 and out of the radially outwardly extending recesses 104, 106 of the grooves 96, 98 into a position where the crank pin can move into the remainder of the grooves while at the same time driving the crank pin in a circular motion. This action is represented in FIGS. 8 and 9. As will be appreciated the rear wheels 16, 18 begin turning during this portion of rotation of the cam/crank structure 90 movement. It will be appreciated that at this point the stop pin 168 has been moved out of its blocking position, thus permitting the crank pin 94 to move in the grooves 96, 98 as illustrated. The rear wheels 16, 18 turn in a direction opposite to that of the front wheels 12, 14 as represented by the lines 204, 206 in FIG. 1.

Figure 10:
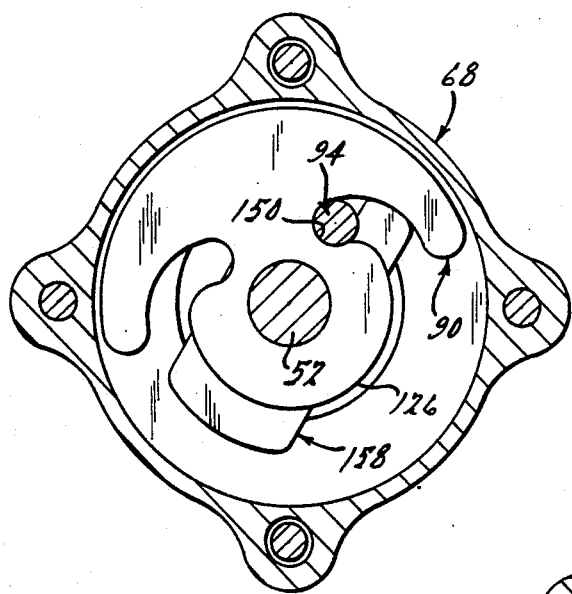
FIG. 10 is a view similar to FIG. 6 with the cam/crank mechanism in its pure cranking position.
Figure 11:
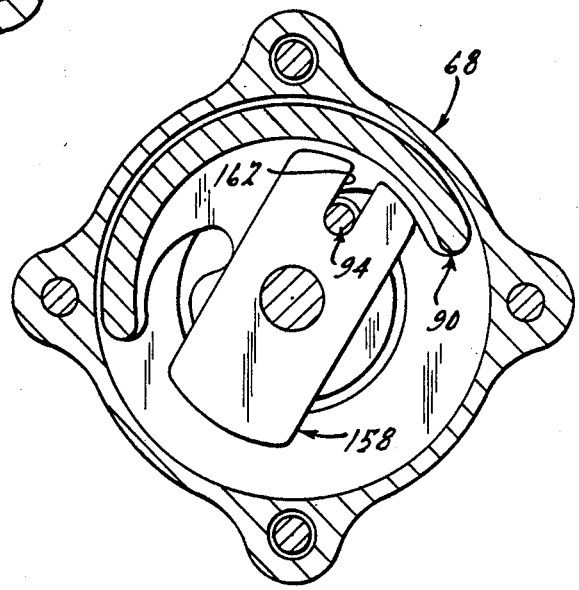
FIG. 11 is a view similar to FIG. 7 with the mechanism in the same position of that shown in FIG. 10.
Figure 12:
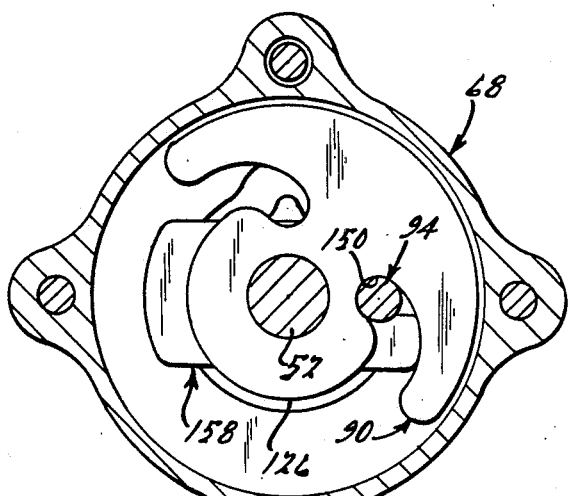
FIG. 12 is a view similar to FIG. 6 with the cam/crank mechanism in its final position.
Figure 13:
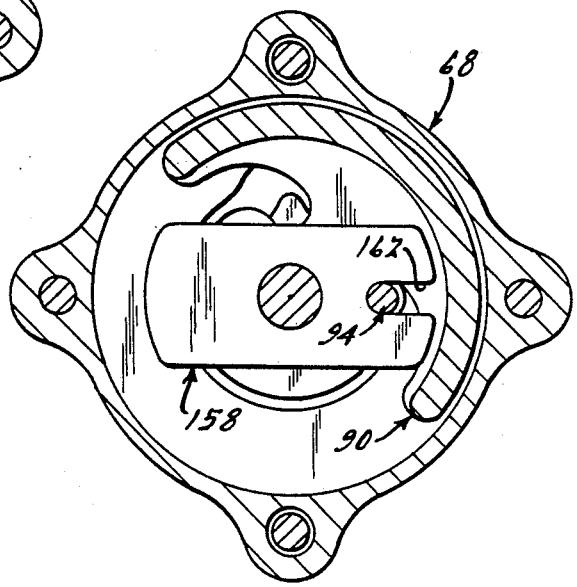
FIG. 13 is a view similar to FIG. 7 with the mechanism in the same position as that shown in FIG. 12.

The crank pin 94 is moved to the bottom of the output crank structure slot 162 substantially simultaneously with the crank pin contacting the third crank surface portions 148, 150 of the cam/crank structure 90 as illustrated in FIGS. 10 and 11. At this point, the crank pin is trapped between these two surfaces and is cause to move in the grooves 96, 98 thereby driving the output crank structure 158 and turning the rear wheels. The full extent of this movement is illustrated in FIGS. 12 and 13. The lines 204, 206 of FIG. 1 represent maximum rear wheel turning while the lines 208, 210 represent maximum front wheel turning. As will be appreciated from the angularity of these lines, the front wheels desirably turn through a greater angle than do the rear wheels even after initial front wheel turning. This is caused by a gear reduction in the gearbox 56. In one actual embodiment, the rear wheels turn only through an angle of 8 degrees with the front wheels turning through an angle of 33 degrees, 14.75 degrees of which turning takes place before rear wheel turning starts.

This smaller degree of rear wheel turning is, however, effective in reducing the curb-to-curb turning radius of the vehicle. In one embodiment, the curb-to-curb turning radius of a large van was reduced from 50 feet to 36 feet.

The above-described combination is operative to return the output shaft 52 and crank pin 94 to their initial positions upon rotation of the input shaft 48 in the reverse direction. However, in the return movement, the lower second cam/crank surface portions 140, 142 or 144, 146 (FIG. 3) come into play to cause the crank pin 94 to return to its centered position. As will be appreciated, the final centered position in which the crank pin 94 is forced into the notches 112, 114 of the recesses 104, 106 is caused by the stop pins 168, 170 again contacting the crank pin 94 and, along with the cam surfaces, causing it to center in the notches 112, 114 as desired.

Having thus described our invention, we claim:

1. A rear wheel steering drive mechanism for a vehicle having a front wheel steering system and a rear wheel steering system, the rear wheel steering drive mechanism comprising a casing, an input shaft and an output shaft journaled in the casing, the input shaft adapted to be operatively connected to the front wheel steering system for rotation thereby whenever the front wheel steering system is activated, the output shaft adapted to be operatively connected to the rear wheel steering system to selectively transmit front wheel steering system activity to the rear wheel steering system, a combination cam/crank structure positioned within the casing and connected to the input shaft for rotation therewith, a loose crank pin positioned within the casing in operative contact with the cam/crank structure, the casing having an annular groove therewithin, the crank pin received in the annular groove for movement therein, the groove having a radially outwardly extending recess, the cam/crank structure having a first cam surface portion which maintains the crank pin in a position within the radially outwardly extending recess of the groove during the initial portion of input shaft rotation thereby preventing movement of the crank pin in the remainder of the groove, the cam/crank structure having a second cam/crank surface portion which directs the crank pin out of the radially outwardly extending recess of the groove during a second portion of input shaft rotation into a position where the crank pin can move into said remainder of the groove while at the same time driving the crank pin in a circular motion, the cam/crank structure having a third crank surface portion which thereafter drives the crank pin in said remainder of the groove during a third portion of input shaft rotation, an output crank structure positioned within the casing and connected to the output shaft to rotatively drive the output shaft, the crank pin being in driving contact with the output crank structure when the crank pin is driven in said remainder of the groove to thereby cause the output crank to rotate and thus cause the output shaft to rotate and transmit front wheel steering activity to the rear wheel steering system, the above described combination being operative to return the output shaft and crank pin to their initial positions upon rotation of the input shaft in the reverse direction.

2. A rear wheel steering drive mechanism as defined in claim 1, further characterized in that the cam/crank structure includes duplicate first, second and third surface portions positioned symmetrically about a radius of the cam/crank structure to facilitate driving the output shaft in both clockwise and counterclockwise directions.

3. A rear wheel steering drive mechanism as defined in claim 1, further characterized in that the first cam surface portion is substantially circular.

4. A rear wheel steering drive mechanism as defined in claim 1, further characterized in that the second cam/crank surface portion is in the form of a radially inwardly spiralling slot, the termination of which defines the third crank surface portion.

5. A rear wheel steering drive mechanism as defined in claim 1, further characterized in that the cam/crank structure includes a pair of spaced apart first, second and third surface portions for simultaneous contact with the crank pin at spaced apart locations.

6. A rear wheel steering drive mechanism as defined in claims 3, 4 or 5, further characterized in that the cam/crank structure includes duplicate first, second and third surface portions positioned symmetrically about a diameter of the cam/crank structure to facilitate driving the output shaft in both clockwise and counterclockwise directions.

7. A rear wheel steering drive mechanism as defined in claim 2, further characterized in that output crank structure includes a slot, the crank pin being positioned in the slot at all times, the crank pin being free to move in the slot during actuation thereof by the second cam/crank surface portion during the second portion of input shaft rotation, the side surfaces of the slot defining crank surfaces contacted by the crank pin during the second and third portions of input shaft rotation.

8. A rear wheel steering drive mechanism as defined in claim 7, further characterized in that the crank pin has a portion of reduced diameter intermediate the ends thereof, the reduced diameter portion being slidably received in said slot, the adjacent portions of the crank pin being positioned on the exterior of the output crank structure and are of larger diameter than the width of said slot to thereby prevent axial movement of the crank pin.

9. A rear wheel steering drive mechanism as defined in claim 8, further characterized in that the cam/crank structure includes a pair of spaced apart first, second and third surface portions for simultaneous contact with the crank pin on either side of said larger diameter portions, the output crank structure being positioned between said pairs.

10. A rear wheel steering drive mechanism as defined in claim 2, further characterized in the groove has a notch extending radially outwardly from substantially the center of the recess, the crank pin being initially positioned in the notch by said first cam surface portions to prevent random slight movement of the crank pin in the groove prior to rotation of the output shaft.

11. A rear wheel steering drive mechanism for a vehicle having a front wheel steering system and a rear wheel steering system, the rear wheel steering drive mechanism comprising a casing, an input shaft and an output shaft journaled in the casing, the input shaft adapted to be operatively connected to the front wheel steering system for rotation thereby whenever the front wheel steering system is activated, the output shaft adapted to be operatively connected to the rear wheel steering system to selectively transmit front wheel steering system activity to the rear wheel steering system, a combination cam/crank structure positioned within the casing and connected to the input shaft for rotation therewith, a loose crank pin positioned within the casing in operative contact with the cam/crank structure, the casing having a radially outwardly extending internal recess, the cam/crank structure having a first cam surface portion which maintains the crank pin in a position within the recess during the initial portion of input shaft rotation thereby preventing movement of the crank pin in the remainder of the casing interior, the cam/crank structure having a second cam/crank surface portion which directs the crank pin out of the recess during a second portion of input shaft rotation into a position where the crank pin can move around the remainder of the casing interior while at the same time driving the crank pin in a circular motion, the cam/crank structure having a third crank surface portion which thereafter drives the crank pin around the remainder of the casing interior during a third portion of input shaft rotation, an output crank structure positioned within the casing and connected to the output shaft to rotatively drive the output shaft, the crank pin being in driving contact with the output crank structure when the crank pin is driven in the remainder of the casing interior to thereby cause the output crank to rotate and thus cause the output shaft to rotate and transmit front wheel steering activity to the rear wheel steering system, the above described combination being operative to return the output shaft and crank pin to their initial positions upon rotation of the input shaft in the reverse direction.

12. A rear wheel steering drive mechanism as defined in claim 11, further characterized in that the cam/crank structure includes duplicate first, second and third surface portions symmetrically about a radius of the cam/crank structure to facilitate driving the output shaft in both clockwise and counterclockwise directions.

13. A rear wheel steering drive mechanism as defined in claim 11, further characterized in that the first cam surface portion is substantially circular.

14. A rear wheel steering drive mechanism as defined in claim 11, further characterized in that the second cam/crank surface portion is in the form of a radially inwardly spiralling slot, the termination of which defines the third crank surface.

15. A rear wheel steering drive mechanism as defined in claim 11, further characterized in that the cam/crank structure includes a pair of spaced apart first, second and third surface portions for simultaneous contact with the crank pin at spaced apart locations.

16. A rear wheel steering drive mechanism as defined in claims 13, 14 or 15, further characterized in that the cam/crank structure includes duplicate first, second and third surface portions symmetrically about a diameter of the cam/crank structure to facilitate driving the output shaft in both clockwise and counterclockwise directions.

17. A rear wheel steering drive mechanism as defined in claim 12, further characterized in that the output crank structure includes a slot, the crank pin being positioned in the slot at all times, the crank pin being free to move in the slot during actuation thereof by the second cam/crank surface portion during the second portion of input shaft rotation, the side surfaces of the slot defining crank surfaces contacted by the crank pin during the second and third portions of input shaft rotation.

18. A rear wheel steering drive mechanism as defined in claim 17, further characterized in that the crank pin has a portion of reduced diameter intermediate the ends thereof, the reduced diameter portion being slidably received in said slot, the adjacent portions of the crank pin being positioned on the exterior of the output crank structure and of larger diameter than the width of said slot to thereby prevent axial movement of the crank pin.

19. A rear wheel steering drive mechanism as defined in claim 18, further characterized in that the cam/crank structure includes a pair of spaced apart first, second and third surface portions for simultaneous contact with the crank pin on either side of said larger diameter portions, the output crank structure being positioned between said pairs.

20. A rear wheel steering drive mechanism as defined in claim 12, further characterized in the casing interior has a notch extending radially outwardly from substantially the center of the recess, the crank pin being initially positioned in the notch by said first cam surface portions to prevent random slight movement of the crank pin in the casing prior to rotation of the output shaft.

* * * * *